UNITED STATES PATENT OFFICE.

JOSEPH G. HALEY, OF NEW YORK, N. Y.

IMPROVEMENT IN COMPOUNDS FOR A WATER-PROOF MATERIAL.

Specification forming part of Letters Patent No. 149,749, dated April 14, 1874; application filed January 2, 1874.

*To all whom it may concern:*

Be it known that I, JOSEPH G. HALEY, of the city, county, and State of New York, have invented a new and improved Compound for Water-Proof Material; and I do hereby declare the following to be a full, clear, and exact description thereof, which will enable those skilled in the art to make and use the same.

This invention relates to a compound produced of hydraulic lime, linseed-oil, and asbestus, sulphate of zinc, alum, bisulphuret of carbon, and calcined kaoline or clay, which ingredients are prepared and mixed together in the following manner:

First, I take fresh hydraulic lime, reduce it to a fine powder, and mix it with boiled linseed-oil to the consistency of putty, which is then spread out in a warm dry place for about eight days, making what I term "lime-soap." Then I take asbestus and reduce it to a fibrous state by any suitable means, and saturate with a strong solution of sulphate of zinc, alum, and bisulphuret of carbon, and allow it to dry.

The ingredients used for the preparation of the asbestus are used in about the following proportion: Sulphate of zinc, four parts, by weight; alum, two parts, by weight; bisulphuret of carbon, one part, by weight; water, ten parts, by weight.

The asbestus, after having been prepared, as above stated, I mix together with the prepared hydraulic lime or lime-soap, and with calcined kaoline or fine clay in about equal proportions, and the compound thus obtained is finally mixed with boiled linseed-oil to the required consistency, according to the nature of the work to be done. For instance, it can be reduced to a consistency so as to be readily applied with a brush, or to the consistency of mortar to be applied with a trowel, the action of the sulphate of zinc and bisulphuret of carbon being such that the oil is entirely decomposed, whereby is deposited a resinous substance of great adhesive power. The bisulphuret of carbon partially dissolves the oil, thereby rendering its immediate application easier; then, as the oil dries, the moisture from the atmosphere attacks the sulphate of zinc and carbon, and the process of decomposition commences as the mastic dries. The process continues until the mass becomes perfectly hard and impervious to water, it requiring about two weeks before it becomes thoroughly solid.

This compound can be used with advantage for roofing purposes in ordinary buildings, or in railroad-cars, steamboats, and other structures, and in those cases I take canvas or wire cloth and secure the same firmly to the surface to be covered; then I apply the mastic with a trowel, as ordinary mortar.

In using my compound on the bottoms of iron or wooden ships, I apply the same directly to the surfaces to be protected, and it effectually protects the iron against corrosion and the wood against decay.

My compound can also be used with advantage on cellar walls and floors, or on the outside walls of brick or stone buildings, metal buildings, or roofs of any kind, and for certain purposes I form my compound into sheets or slabs, to be used on the outside or inside of buildings.

My compound is eminently hydraulic, and it hardens readily under the influence of water.

What I claim as new, and desire to secure by Letters Patent, is—

A compound made of lime-soap, prepared of hydraulic cement and linseed-oil, which is mixed with sulphate of zinc, bisulphuret of carbon, alum, asbestus, and clay, substantially in the manner and about in the proportion herein specified.

JOSEPH G. HALEY.

Witnesses:
 FRED. L. HALEY,
 W. HAUFF.